Figure 1:
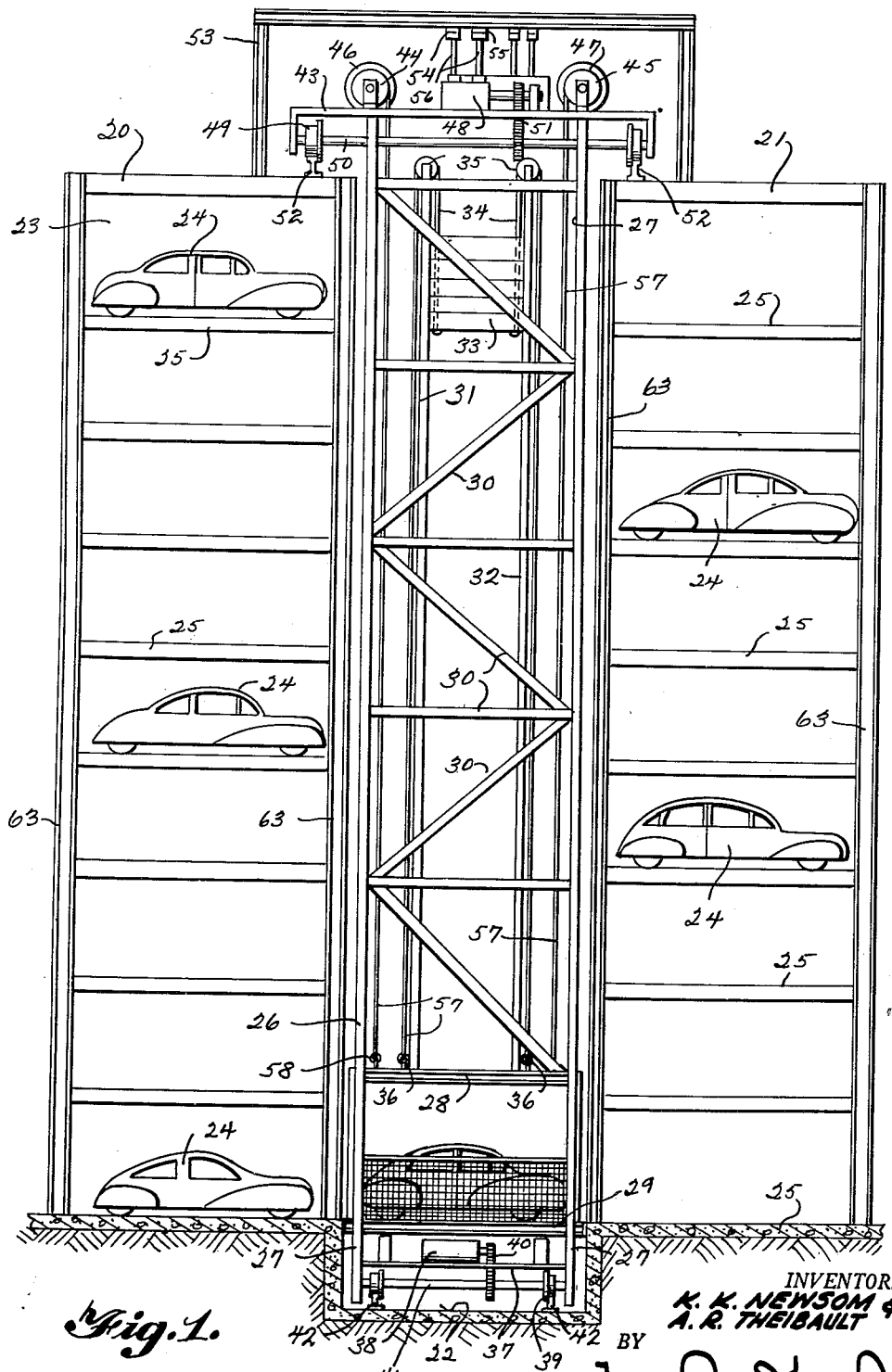

Dec. 13, 1955 K. K. NEWSOM ET AL 2,726,774
MACHINE FOR PARKING MOTOR VEHICLES
Filed Nov. 8, 1948 7 Sheets-Sheet 1

INVENTORS
K. K. NEWSOM &
A. R. THEIBAULT
BY
Mawhinney & Mawhinney
Attorneys

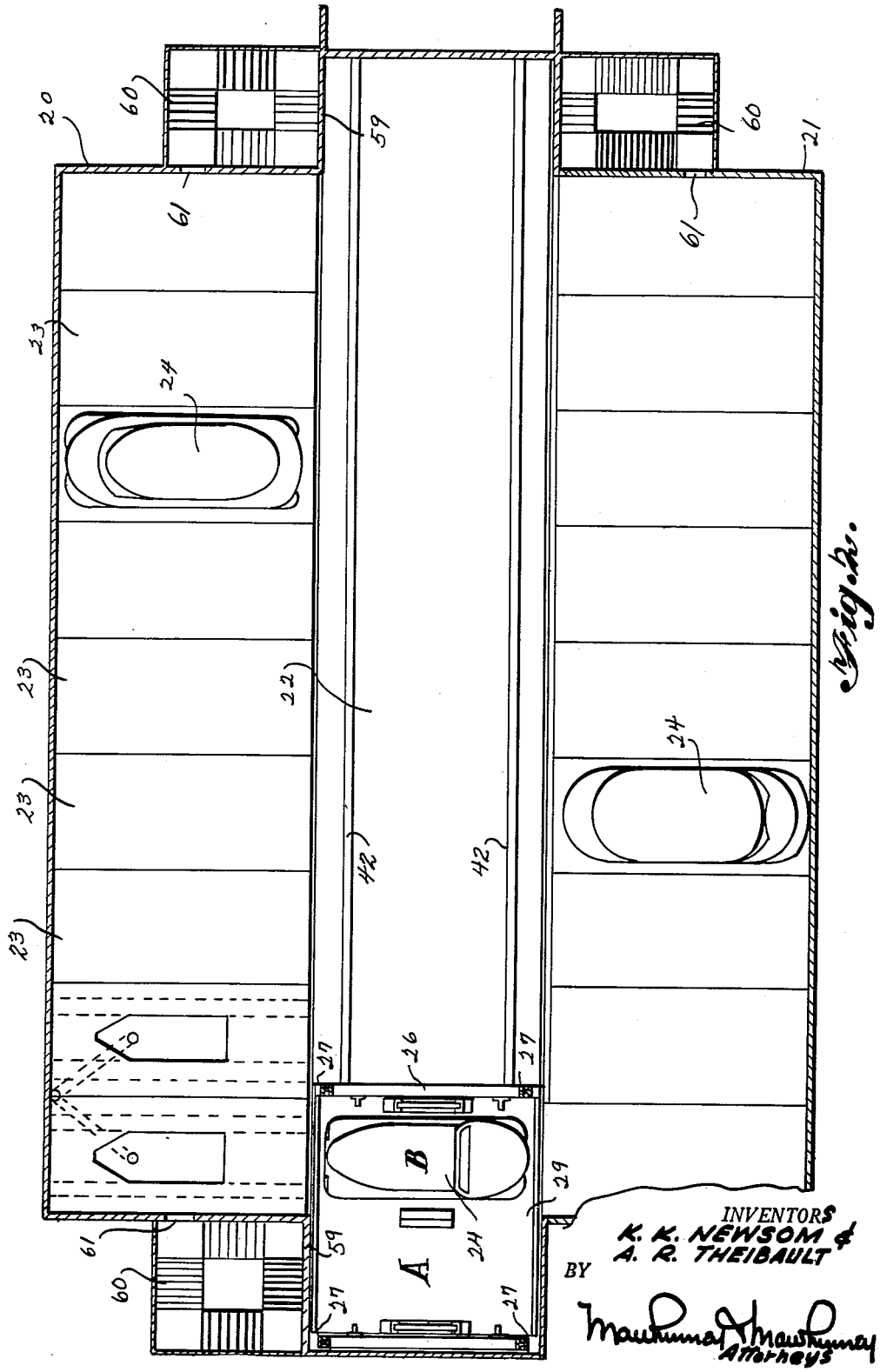

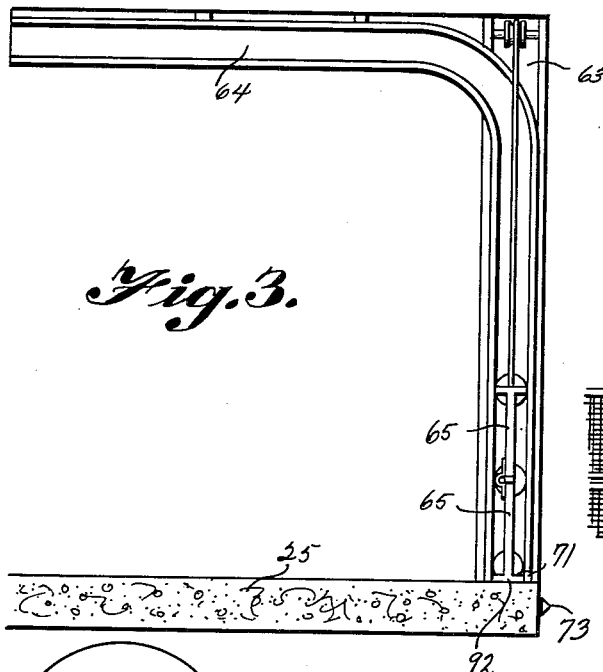
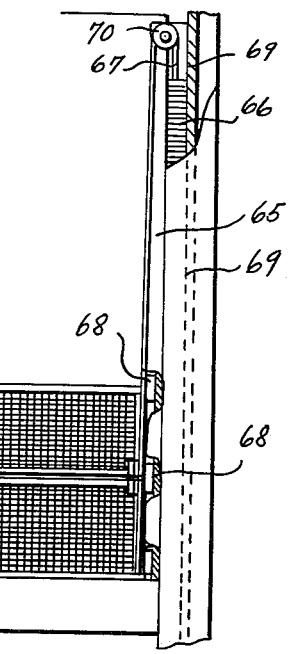
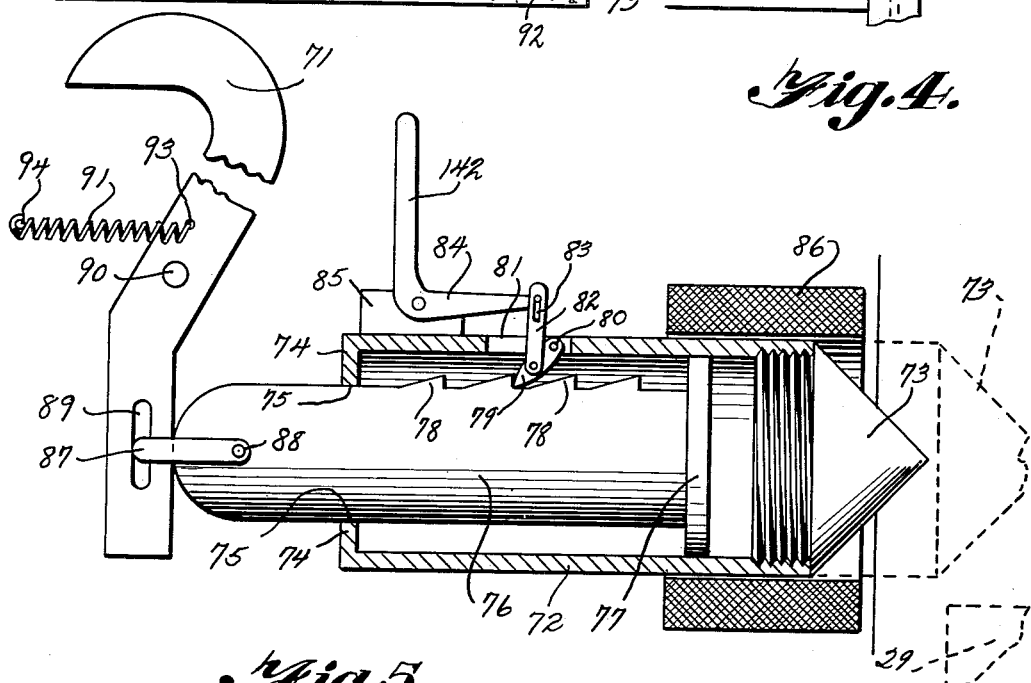

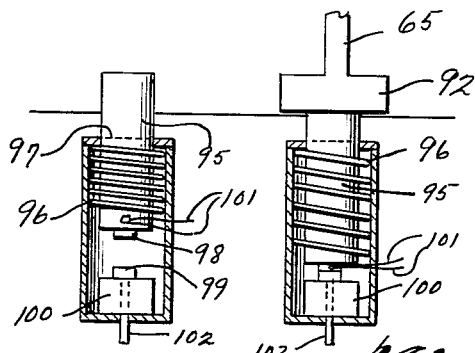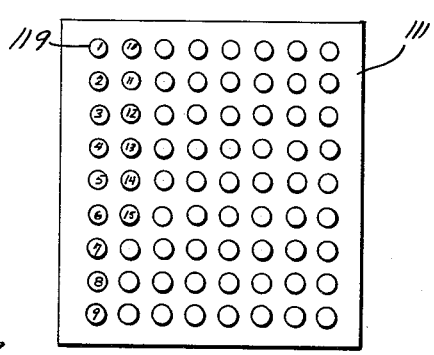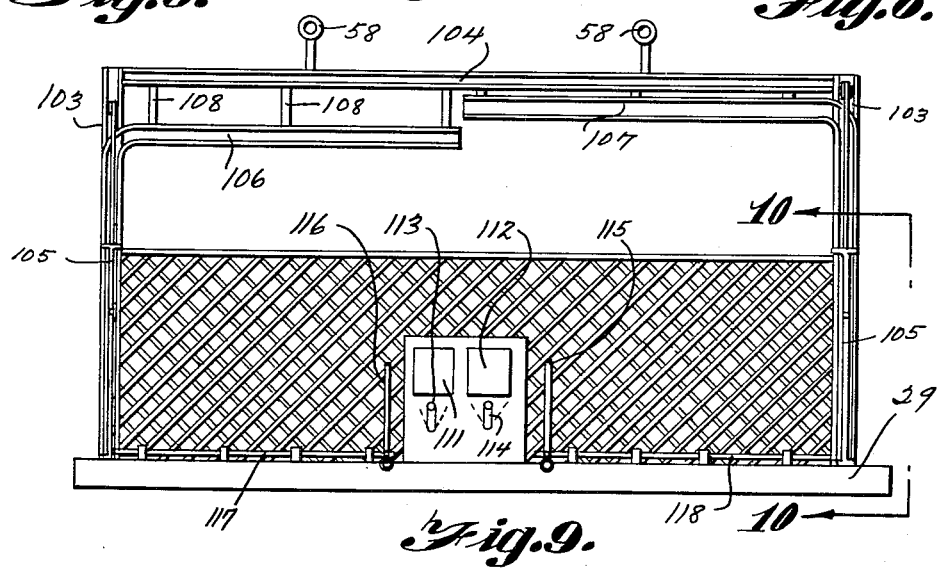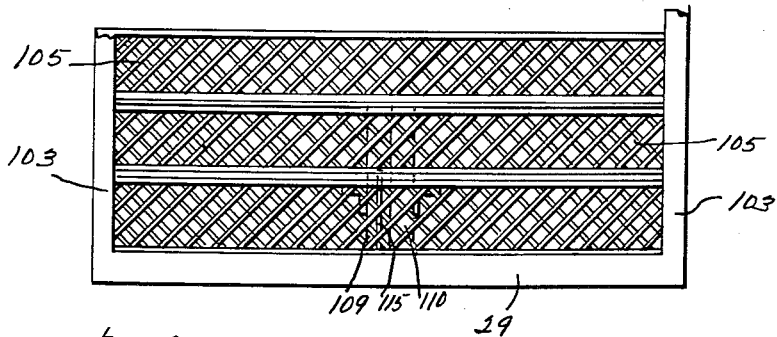

Dec. 13, 1955  K. K. NEWSOM ET AL  2,726,774
MACHINE FOR PARKING MOTOR VEHICLES
Filed Nov. 8, 1948  7 Sheets-Sheet 5
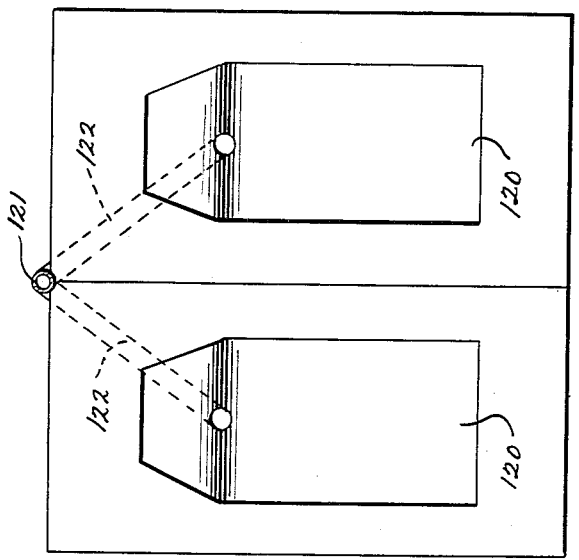
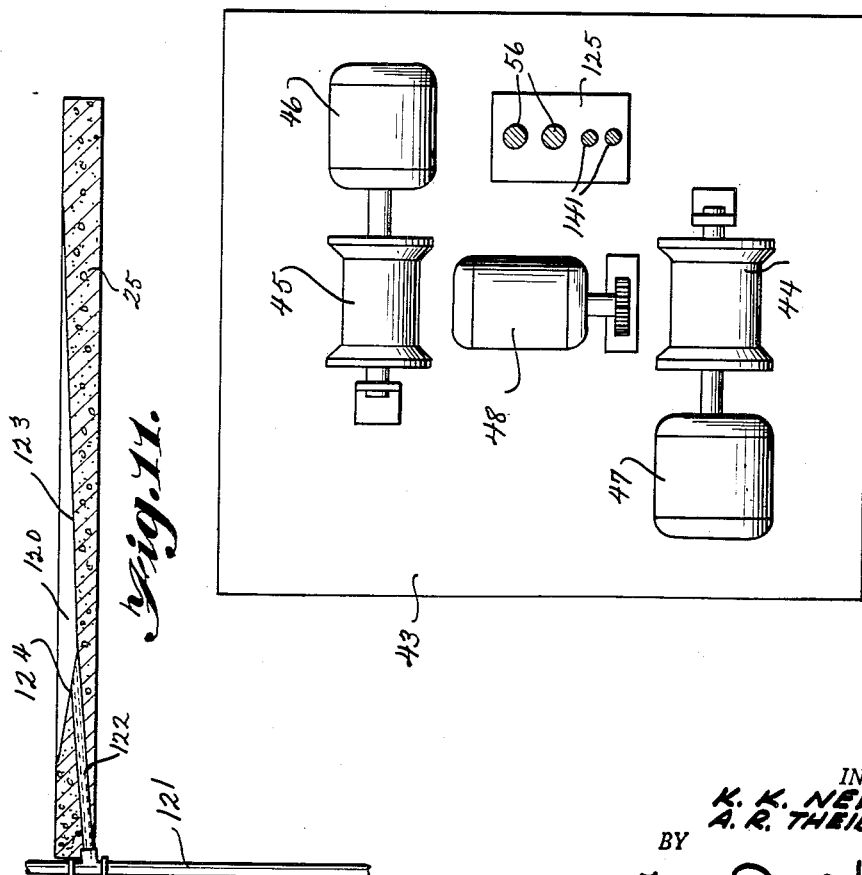
INVENTORS
K. K. NEWSOM &
A. R. THEIBAULT
BY
Mawhinney & Mawhinney
Attorneys Dec. 13, 1955    K. K. NEWSOM ET AL    2,726,774
MACHINE FOR PARKING MOTOR VEHICLES
Filed Nov. 8, 1948    7 Sheets-Sheet 7
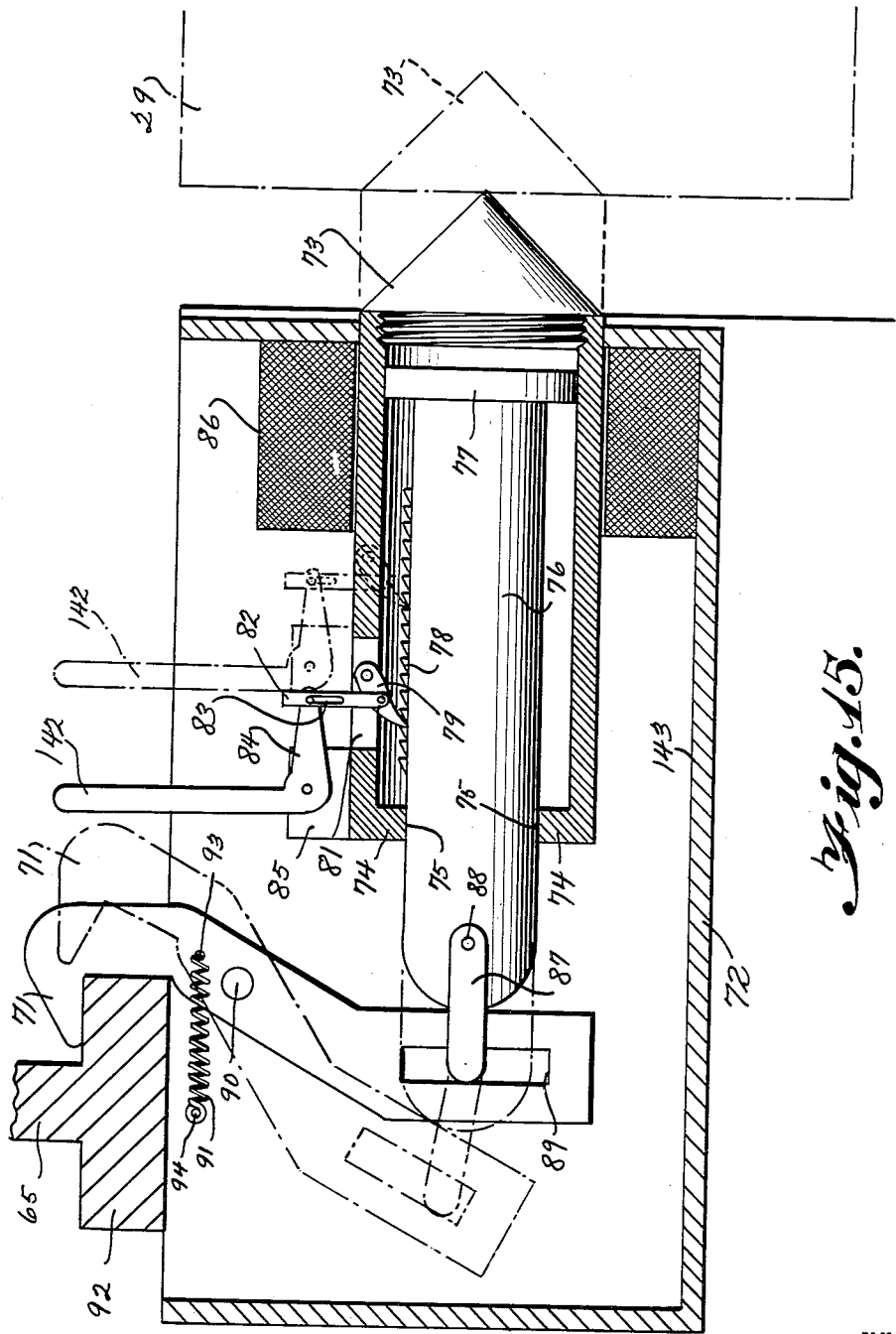
Fig. 45.
INVENTORS
K. K. NEWSOM &
A. R. THEIBAULT
BY
Attorneys

United States Patent Office 2,726,774
Patented Dec. 13, 1955

2,726,774
MACHINE FOR PARKING MOTOR VEHICLES

Kitchener K. Newsom, San Francisco, Calif., and Albert R. Theibault, Cottage City, Md., assignors to Rosenbaum "Q-B-KI" Parking Co., New York, N. Y., a corporation of Delaware Application November 8, 1948, Serial No. 58,924

6 Claims. (Cl. 214—16.1)

The present invention relates to improvements in machines for parking motor vehicles, and more particularly to that type employing individual parking berths which berths are arranged in two spaced apart structures both vertically and horizontally of one another and which employ a traveling elevator tower or shaft adapted to operate both vertically and horizontally in an areaway between the two spaced apart structures whereby automobiles can be rapidly parked and retrieved in a minimum of time.

Another object of the present invention is to provide a machine which will assure safe handling of the vehicle to be stored and protect the same from the abuse of unskilled parking lot attendants who, as it is commonly known in practice, race engines in driving the vehicles up and down the steeply inclined, sharply banked ramps of conventional garages thereby causing unnecessary body and fender damage and requiring brake readjusting which today is a costly item.

Another object of the present invention is to provide a device of the character described which is an advancement over heretofore proposed structures employing traveling elevator shafts between spaced apart storage structures which do not permit of efficient utilization of every square foot of surface parking space and which do not permit the useage of either side of a two-car lift for parking vehicles at the end tiers of storage spaces at either end of the structure.

A further object of the present invention is to provide a device simple in construction which permits of structural adaptation and commercial use in any parking district. It has long been the problem in this art to provide a structure which will meet all of the building code requirements together with fire underwriters' requirements and which is of a durable economic construction permitting of low cost original installation and requiring a minimum of maintenance expenditure.

A still further object of the present invention is to provide a device of the character described wherein a lift will simultaneously vertically elevate and horizontally propel the lift upon which the vehicles are placed and which will properly align the vehicle lift with the desired floor or tier level and compartment into which the vehicle is to be deposited. In this connection we have provided an electrical aligning device which will coordinate with the access gates of the vehicle compartments for permitting entry of the vehicle into the compartment from the elevating platform.

A still further object of the present invention is to provide a device of the character described which will coordinate the aligning device which is retained in the stationary structure with the electrical propulsion machinery carried on the propelling elevator shaft or tower structure.

A still further object of the present invention is to provide a device of the character described which will permit of safe storage of automobiles and wherein a drainage system is provided for removing dripping gas, oil or grease from cars which could result in damage to cars spaced vertically beneath each other and which also would be a fire hazard without such draining system.

A still further object of the present invention is to provide a device of the character described wherein the floor of each of the vehicle stalls at a given tier level is of a concrete slab construction thereby increasing the protection of vertically disposed vehicles in the event of fire in one of the vehicles in that the floor slab will not permit flames from beneath access to the bottom of the car spaced vertically above to spread the fire.

A still further object of the present invention is to provide a vertical tier aligning and gate tripping device which is constructed to be electromagnetically actuated to place an annular plunger having a conical head in the path of the vertically rising car lift which is adapted to be engaged thereby and which will be slid axially inwardly of the structure whereby the gate will be tripped or released and which will simultaneously open the armature circuit of the hoisting elevator and cease vertical movement thereof.

With the foregoing and other objects in view, the invention will be more fully described hereinafter, and will be more particularly pointed out in the claims appended hereto.

Figure 14:
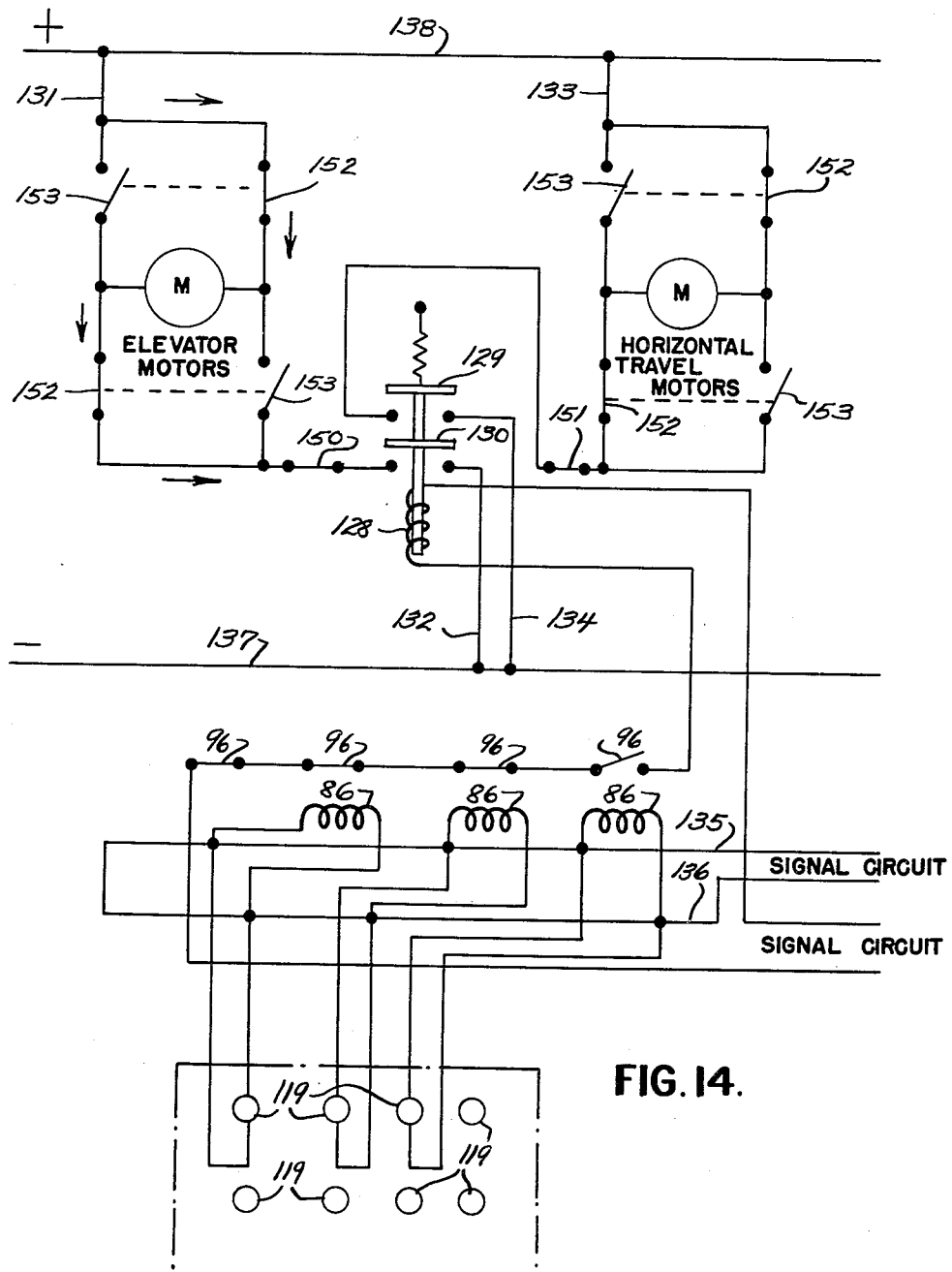

In the drawings, wherein like symbols refer to like or corresponding parts throughout the several views, Figure 1 is a transverse vertical section of a machine embodying the present invention and adapted for the handling and storing of vehicles, Figure 2 is a fragmentary top plan view of Figure 1 with parts removed, Figure 3 is a fragmentary vertical section taken through a vehicle stall showing the stall gate in the lowered position with the aligning plunger partially extended from the base of said stall, Figure 4 is a fragmentary and elevational view taken from the right-hand end of Figure 3, Figure 5 is a fragmentary side elevational view of the improved aligning and gate tripping device employed in connection with the present invention having parts broken away and parts shown in section, Figure 6 is a vertical transverse section taken through the gate actuated switch in the armature circuit of the hoisting elevating and horizontally propelling motors with the switch in the open position, Figure 7 is a similar view to Figure 6 with the switch in the closed position, Figure 8 is a front elevational view of a form of elevator control panel employed in connection with the present invention, Figure 9 is a vertical longitudinal section taken through a vehicle lift employed in connection with the car elevator, Figure 10 is a fragmentary vertical view taken on the line 10—10 of Figure 9, Figure 11 is a vertical longitudinal section taken through the floor of a vehicle stall showing the drainage arrangement, Figure 12 is a top plan view of the tower structure showing the elevator windlass mechanism and the propelling equipment, Figure 13 is a top plan view of two adjacent concrete stall floors showing the common drainage system therebetween, Figure 14 is a schematic wiring diagram of the aligning and gate tripping devices shown in circuit with the elevator and horizontal motors; and Figure 15 is a vertical transverse section taken through the gate aligning and tripping device shown in solid, dotted and dash lines in its various operating positions.

Referring more particularly to Figures 1 and 2 of the drawings, 20 and 21 designate spaced apart structures having an areaway 22 therebetween. The structures 20 and 21 comprise vertically spaced apart vehicle stalls 23 each of which is adapted to receive one vehicle, for instance a vehicle as shown at 24 in Figure 1. Each vehicle stall has a floor 25 upon which the vehicle 24 is received and supported.

Adapted to move transversely between the spaced apart structures 20 and 21 is an elevator shaft or movable scaffold 26 having upstanding members 27 defining an elevator shaft within which is vertically movable an elevator car 28 having a platform 29 adapted to receive two vehicles. The vertically upstanding members 27 are suitably braced and supported by means of cross-bracing 30.

Suitably supported about the medial portion of the cross-bracing of the structure are vertical guides 31 and 32 for guiding counterweights 33 which are affixed to one end of cables 34 and passed over sheaves 35 whilst the other end of the cables 34 are secured to the elevator car 28 as at 36 by means of eye-bolts.

The vertical upstanding members 27 are secured to a base platform 37 upon which is carried a horizontal propelling motor 38 which drives wheels 39 through gearing 40 and shaft 41. The wheels 39 travel over rails 42 which extend the entire length of the areaway 22.

A windlass and propelling platform 43 is secured to the top portions of the vertical upstanding members 27 and carries thereupon windlasses 44 and 45 driven by motors 46 and 47 respectively. A horizontal propulsion motor 48 is also carried on the platform 43 and is connected to drive wheels 49 on shafts 50 through gearing 51. The wheels 49 are adapted to travel over rails 52, the rails extending longitudinally of the upper structure for the entire length thereof and being set back from the edge of the structure as clearly shown in Figure 1.

A suitable bus structure 53 is provided over the areaway 22 for supporting buses 54 and 55 which are adapted to receive the power for supplying the motors 46, 47 and 48 respectively. The motors are connected to the bus structure by means of trollies 56.

The propelling motors 38 and 48 carried upon the bottom and top platforms respectively are electrically connected to afford a synchronized motion therebetween in such a manner that the shaft or tower structure will be propelled evenly both at the top and bottom thereof during horizontal movement.

Lifting cables 57 are provided for the elevator car 28 in such a manner that one end of the cables is secured to the elevator car 28 as by eye-bolts 58 whilst the other ends of the cables 57 are passed about and secured to the windlasses 44 and 45.

Referring more particularly to Figure 2, it will be noted that an end extension or bay 59 is provided at the end of each berth line in such a manner that the elevator car 28 can service the end stalls when the outer vehicle space on the vehicle platform 29 is unoccupied and a vehicle is carried on the inner space and it is desired to deposit such vehicle in the end berth. It has been noted that in all of the structures proposed heretofore that for the lack of this construction it has been impossible to service and efficiently utilize all berth structures from all possible operational conditions. However, with this construction we have made it possible to readily service all available vehicle berths.

In order to comply with the local fire underwriters requirements, access or escape structures 60 are provided to permit exit of human ocupancy from the structure in the event of fire. The interior of the structure at each tier level is placed in communication with the fire escape by means of an exit opening 61. Each tier level is composed of a concrete floor 25 divided into horizontal berthing spaces 23.

Referring next to Figures 3 and 4 wherein is shown a fragmentary vertical section and a fragmentary front elevational view of a car berth, it will be noted that the vertical riser or I-beams 63, defining the width of each berth, afford a support to which are secured the channel guides 64 for receiving and guiding sectional gates 65 which are counter-weighted by weights 66 attached to one end of a cable 67 whilst the other end thereof is secured to the lower section of the sectional gate 65. The gate slides freely within the confines of the channel 64 on rollers 68 rotatably secured to the sectional gates 65. The weights 66 travel between the channel guide supports 64 and the web 69 of the vertical riser 63. The cable 67 passes over a sheave 70. The gates 65 are retained normally in the lowered position by a pivotal latch 71 which is adapted to be released through a latch release mechanism shown more fully in Figures 5 and 15.

The mechanism consists of an outer annular member 72 constructed of a highly magnetic material such as cobalt or nickel steel having a conical head 73 at one end thereof and having shoulders 74 at the other end thereof. The shoulders 74 terminate in an annular opening 75 through which is received a plunger or piston member 76 constructed of a non-magnetic material such as aluminum having a guide disk 77 at one end thereof. Ratchet teeth 78 are provided on the piston member 76 over which passes a counter-weighted pawl 79 which is hingedly supported to the annular member 72 as by a pin 80. An access slot 81 is provided in the member 7 whereby the pawl may be released from engagement with the ratchet teeth 78. A pawl release mechanism is provided consisting of a pawl engaging member 82 pivoted to the pawl at one end and having a vertically elongated slot 83 therein to permit a pin of a crank arm 84 to pass upwardly and downwardly therein. The crank arm 84 is pivotally carried by a support block 85 which block is secured to and movable with the outer annular member 72. The other end of the crank arm 84 is provided with an upstanding shaft 142. The latch release member is provided with the shaft 142 which may be slid axially towards the pivotal latch 71 to release the pawl mechanism. An electromagnetic coil 86 is provided for supplying a solenoid effect to the magnetic core 72 by means of a momentary contact type switch 119 and the coil 86 is located to partially envelope the conical head 73 of the annuar member 72. The plunger or piston member 76 is connected to the latch mechanism 71 by means of a pivotal link 87, one end of which is pivoted at 88 whilst the other end passes through the slot 89 in the base shank of the latch member 71. The latch member 71 is pivoted at 90 and a coil spring 91 is provided to urge the latch member 71 into contactual overlapping engagement with the base 92 of the gate 65. This is done by securing one end of the spring 91 to the latch member 71 as at 93, an opening in the latch member, and by securing the other end of the spring 91 to a rigid immovable abutment.

Referring more particularly to Figures 6 and 7, it will be noted that a form of switch is shown which is adapted to be employed in connection with the sectional gates 65 and which is adapted to be closed when the base 92 of the gates 65 is at its lowermost position and the latch 71 passed thereover as best seen in Figure 7. This switch comprises a plunger 95 having one end of a coil spring 96 secured thereto whilst the other end of the coil spring abuts the switch housing 97. Electrical contacts 98 and 99 are provided one at the base of the plunger 95 and the other carried by the housing 97 and insulated therefrom as by a block 100. Electrical leads 101 and 102 are provided for connecting this switch in circuit with the armature motors of both the vertical elevators and the horizontal propelling motors. The switch is shown in the open position in Figure 6 as when the gate is raised whilst the switch is shown in the closed position in Figure 7.

Referring more particularly to Figures 9 and 10 wherein the vehicle receiving elevating platform is more fully shown, the base or receiving element 29 is provided with upstanding support members 103 of appropriate I-beam or channel construction and the appropriate connecting or span structure 104 is provided about the top portion thereof. At each end of the platform there are provided counter-balanced sectional gates 105 which are confined within guides 106 and 107 respectively. These guides are supported from the overhead by means of spacer struts 108. The counterweight structure for the gates 105 is identical to that shown for the berth structure gates in more detail in Figures 3 and 4. Twin operating switch boards 109 and 110 are shown proximate the medial portion of the platform 29 and each switchboard is provided with panel boards 111 and 112 arranged such that the two boards 109 and 110 many be operated to permit alignment of a car berth with either side of the platform. Each of the four panel boards has buttons to energize the coil 86 at each vehicle receiving berth. The wiring of these panels may be of any appropriate manner well-known in the art.

Elevator car release levers 115 and 116 respectively are provided to release either of the end gates 105 from the switch board location through linkages 117 and 118 respectively. When the lever 116 as shown in Figure 9 is moved to the right the entrained linkage 117 will be shifted to the right removing the same from contact with the base of the gate 105 allowing the counter-weighted component to raise the gate. A similar structure is provided at the opposite end of the elevator car and is actuated by the lever 115. It will be noted that the vertical upstanding members 103 are set back from the edge of the platform 29 for a reason to be set forth more fully hereinafter.

Referring more particularly to Figure 8, it will be noted that a form of control panel 111 is shown wherein a single button system 119 can be employed wherein it is necessary to employ only one button for limiting both vertical and horizontal movement of the elevator. This is accomplished by the opening of contacts 98—99 in the signal circuit resulting in a deenergization of the main power supply to the elevator and travel motors.

Referring more particularly to Figures 11 and 13 wherein a drainage system is shown the concrete slab or flooring 25 is shown as having drainage recesses 120 which are placed in communication with a vertical drain pipe 121 directed to a common sump, not shown, by means of a terracotta drain pipe 122 to drain the oil and gasoline which may seep from beneath the vehicle and remove the same from the area to eliminate possible fire hazard. As shown in Figure 13, one drain pipe 121 may be used for each two adjacent vehicle berths and such drain pipe may extend for the height of the structure and suitable connecting means provided between each of the terracotta drains 122 of each slab. The slab member 25 as best seen in Figure 11 is provided with downwardly sloping walls 123 and 124 and assure proper drainage of the liquid materials into the terracotta pipe 122.

Referring to Figure 12, the motors 46, 47 and 48 are electrically controlled through switching housing 125.

Referring more particularly to Figure 14, a simple schematic wiring diagram of the aligning and gate tripping device and its relationship to the elevator and horizontal travel motors is shown from which it will be noted that a plurality of push buttons 119 carried upon panel 111 are placed in electrical communication with the magnetic coil 86 of the aligning and gate tripping device by leads 126 and 127. It will also be noted that all of the gate tripping devices are illustrated schematically by the coils 86 in vertical arrangement. Switching contacts 98 actuated by the gate base 92 of the sectional gates 65 are all shown in series circuit and connected to a solenoid 128 for actuating contacts 129 and 130 in the armature circuits of the elevator and horizontal travel motors respectively. The series circuit embodying the switches actuated by the gates is provided with a potential to normally maintain a sufficient magnetic field in the solenoid 128 to retain contacts 129 and 130 in a closed position. The contacts 129 are in circuit with the motors 47 and 48 via leads 131, 132, 133 and 134. The horizontal travel motors, as well as the vertical elevating motors, are independently controllable. Each motor has a main control switch 150 and 151, the switch in its center position being open. When it is desired to drive the motors in one direction the contacts 152 are closed and contacts 153 are opened. These contacts are gang operated to assure that upon closing contacts 152 that contacts 153 will always be open and vice versa. The elevator and horizontal travel motors are supplied current by buses 137 and 138. In series with the motors and buses 137 and 138 are contactors 129 and 130 which are actuated by a solenoid 128. The solenoid 128 receives its current from a signal circuit. In series with this solenoid signal circuit are all of the gate actuated control switches 96. Upon any one of the switches 96 being opened intentionally or fortuitously, the solenoid 128 will be de-energized, thereby opening contacts 129 and 130, thus opening the power supply to both the horizontal and elevating motors and stopping same. The switches 150 and 151 are controlled by levers 113 and 114 respectively as are switches 152 and 153 to each side of the levers as shown in the dotted line positions in Figure 9.

The independent wiring and control of the motors is a teaching of the U. S. patent to William J. Porter No. 1,757,331 granted May 6, 1930, and the simultaneous elevating and horizontal traveling feature is in accordance with the teaching of the U. S. patent to William G. Beecher et al., No. 1,779,998 granted Oceober 28 1930.

The magnetic coils are supplied with a potential sufficient to produce the field necessary to draw the outer annular member 72 axially through the opening in the coil 86 to place the same in a position to be engaged by the vehicle platform 29 during either its upward ascent or downward descent. The signal circuit is provided through leads 135 and 136 respectively. While we have shown only three of the solenoid actuated aligning and gate tripping devices in Figure 14, it will be appreciated that any number of such devices may be provided and that all of the contacts 98 actuated by the gates will be in series with the solenoid 128 whereby upon the opening of any single gate the circuit will be interrupted and the solenoid de-energized and the contacts 129 and 130 opened thereby rendering the elevator and horizontal travel motors inoperative until the open switch is closed.

The elevator and horizontal travel motors 47 and 48 are placed in communication with an appropriate source of electrical energy through leads 137 and 138 having fuses 139 and 140 in series therewith.

In operation the machine functions as follows. The vehicles 24 are driven upon the loading platform 29 as shown in Figure 1 and the gates 105 of the elevator car 28 are closed as best seen in Figure 9. The operator then selects the desired berth into which the car is to be deposited, for instance berth No. 1 from side A of the platform 29 whilst the vehicle in side B is to be deposited in the adjacent berth at the same tier level. When the operator presses the button No. 1 on the switch board on the A side of the platform 29 the coil 86 of berth I, a magnetic field is set up about the coil 86 which will draw the outer annular member 72, which is of a high magnetic material, axially outwardly because of its sucking coil effect thereupon and in so doing the pawl 79 will ascend the inclined shoulders of the ratchet teeth 78 and seat behind the vertical wall of the teeth 78 when the member 72 has reached its maximum forward extensible position as shown in dotted lines in Figure 5.

It will be noted from Figure 15 that the latch releasing mechanism is shown in solid, dotted and dash line positions for its various phasial operations. The original solid line position is the normal position of the mechanism at rest. When the electromagnetic coil 86 is energized the magnetic core 72 having a conical head 73 will be sucked axially outward to the dotted line position shown thereby placing the same in an obstructive path by the elevator car vehicle platform 29 shown in dash line. During this sucking action the pawl 79 will slide over the inclined walls of the ratchet teeth 78 and will assume the position shown in the dotted lines. When the elevator platform comes into contact with the conical head 73 the same will be cammed or urged axially inwardly whereby the plunger 76 will assume the dash line position. The pivotal link 87 will have then traveled to the bottom of the slot 89 in the base of the latch member 71 and cause the latch member 71 to be pivoted about its fulcrum 90 thereby extending coil spring 91, which action removes the latch 71 from contact with the base 92. The counter-weight 66 of the gate 65 will then cause the gate 65 to raise vertically whereupon the signal switch shown in Figure 6 will open and the solenoid 128 in the signal circuit will be de-energized thereby permitting the spring biased contacts 129 and 130 to assume their normal open position. When the vehicle has been placed in the stall and the operator returns to the vehicle platform 29 upon the operator's grasping and closing the sectional gate 65 when the gate 65 and its base 92 reach the berth floor the upstanding shaft 142 is then lightly kicked towards the vehicle stall. The crank arm 84 is pivoted and the pawl engaging member 82 is raised thereby removing the pawl 79 from contactual engagement with the teeth 78. The distorted or extended spring 91 is returned to restore the latch 71 from the dotted line position to the original solid line position, at which time the gate 65 is firmly retained in the closed position. The entire mechanism may be installed within a minimum of space and may be provided with an outer shell or box 143 to protect and hinge the moving mechanism where necessary. The switch housing 97 of the switch as shown in Figure 6 and 7 may be attached to the side of the box 143 in such a manner that the base 92 of the gate will actuate the plunger 95 of such switch when the same is in the lower or closed position.

The vehicle platform 29 then assumes its alignment with the concrete floor 25 of berth I and the vehicle 24 is thence driven from the platform 29 into the berth. It will be appreciated that the above described operation of the mechanism for berth I will simultaneously take place in the adjacent berth by reason of the platform 29 actuating two of the conical heads. This same operation will take place in the adjacent vehicle berth simultaneously and the operator will then select the appropriate button on the panel 111 to return him to the original starting position and by arcuate movement of the switch lever 113 will set the elevator in operation for the return.

While we have not described in detail the horizontal alignment mechanism it would suffice to say that a device similar to that shown in Figure 5 may be employed to be engaged by the tower structure on its horizontal movement. In a situation where the plunger actuated switch, situated at the stall, is employed to control only the vertical vector the above may be employed to control the horizontal vector.

The signal in the coils 86 and contacts 98 and 99 is communicated from the movable tower structure to the stationary structure through the media of trollies or buses 141 in a manner similar to that described in the bus structure referring to the overhead trollies 56.

A vitally important advantage gained in the construction of the present invention is utilized when it is desired to place a vehicle on side B of platform 29 in berth I or in fact any of the end berths in a vertical tier the tower structure is propelled out into the projecting end or bay 59 thus bringing the occupied side B in line with berth No. I. It is well-known that during the rapid parking of vehicles a vehicle might be driven on the side B of the lift when only an end berth would be available at the opposite side thereof and as heretofore known this has resulted in appreciable confusion and a loss of efficient utilization of each berth in a rapid manner. A great many examples of combination pick ups and deposits are made possible only through the construction of the berthing structure in the manner shown in Figure 2 whereby the unoccupied side of the vehicle platform 29 may be driven beyond the berthing structure. This half-step or split operation of the vehicle platform 29 is accomplished by providing two panel boards on each side of the vehicle receiving platform 29 whereby the entire platform may be controlled from one side alone. The type of wiring to accomplish such control is one understood in the art and need not be gone into detail here.

From the principles of operation set forth hereinabove and from the structure described hereinbefore it will be appreciated that many combinations may be employed for the storing and retrieving of vehicles which combinations need not be described in detail herein.

Although we have disclosed herein the best form of the invention known to us at this time, we reserve the right to all such modifications and changes as may come within the scope of the following claims.

What we claim is:

1. In a machine for parking motor vehicles, two structures having motor vehicle berths therein spaced both horizontally and vertically and said structures spaced apart to provide an elevator areaway horizontally beyond the end berths, an elevator having at least two vehicle receiving spaces side by side in the horizontal direction of the areaway movable up and down in said areaway and into the extensions of the areaway to permit registration of the inner vehicle receiving spaces of the elevator and the end berths of said structures, and means for moving said elevator in a diagonal line in said areaway, a gate for each vehicle berth biased to open position, latch release means for releasably holding said gates in closed position comprising a coil and a movable core having an end adapted when projected by energizing the coil to extend into the path of the elevator to be returned to origin position as the elevator approaches the landing of the berth, a plunger movably mounted relatively to said core and coupled to said latch means, a lost-motion device between said core and plunger to permit projection of said core without moving said plunger or latch means but to cause entrainment of said core, plunger and latch means on the retracting movement of said core by the elevator, means to disengage said lost-motion device, means for restoring the latch means to latching position, and elevator actuated means for controlling the release of said latch means.

2. A machine for parking motor vehicles as claimed in claim 1 characterized by the fact that said lost-motion device comprises a pawl and ratchet between said core and plunger.

3. A machine for parking motor vehicles as claimed in claim 1 characterized by the fact that said core is of a highly magnetic material and said plunger is of a non-magnetic material.

4. A machine for parking motor vehicles as claimed in claim 1 characterized by the fact that the means for restoring the latch means to latching position is a spring.

5. A machine for parking motor vehicles as claimed in claim 1 characterized by the fact that the means for disengaging said lost-motion release device comprises a lever which is adapted to be operated by the elevator operator to disengage the lost-motion device.

6. In a machine for parking motor vehicles, two structures having motor vehicle receiving berths therein spaced both horizontally and vertically and said structures spaced apart to provide an elevator areaway, said areaway having horizontal and vertical extensions at opposite ends beyond the end vehicle berths in said structures, an elevator shaftway horizontally movable along said areaway and into and out of said extensions, an elevator having at least two vehicle receiving spaces side by side in the horizontal direction of said areaway, propelling means for propelling said elevator shaft horizontally along said elevator shaftway, elevating means carried by said elevator shaftway, individual normally biased open gates vertically disposed at the vehicle receiving end of said vehicle receiving berths, and control means one unit of which is carried centrally on said elevator and the other unit of which is carried at the vehicle receiving ends of said berths being positioned to when selected by said first control unit to actuate said second control unit simultaneously opening the selected individual gate and aligning said vehicle receiving platform with the desired vehicle receiving berth, said centrally grouped first control unit being positioned on said elevator for controlling the alignment of either side of the elevator platform with a desired end vehicle receiving berth.

References Cited in the file of this patent
UNITED STATES PATENTS

| Number | Name | Date |
|---|---|---|
| 1,037,637 | Kienker | Sept. 3, 1912 |
| 1,381,263 | Wexler | June 14, 1921 |
| 1,554,584 | Lake | Sept. 22, 1925 |
| 1,609,315 | Schraeder, Jr., et al. | Dec. 7, 1926 |
| 1,614,905 | Tunison | Jan. 18, 1927 |
| 1,773,163 | Becker | Aug. 19, 1930 |
| 1,779,998 | Beecher et al. | Oct. 28, 1930 |
| 1,799,600 | Nell | Apr. 7, 1931 |
| 1,851,539 | Fitch et al. | Mar. 29, 1932 |
| 1,886,943 | D'Humy | Nov. 8, 1932 |
| 1,903,274 | Watson | Mar. 28, 1933 |
| 1,911,015 | Crabbe et al. | May 23, 1933 |
| 1,998,290 | Schraeder | Apr. 16, 1935 |
| 2,223,962 | Mitchell | Dec. 3, 1940 |
| 2,303,656 | Orr | Dec. 1, 1942 |
| 2,520,137 | Erler | Aug. 29, 1950 |